US010689036B2

(12) United States Patent
Stojkovic et al.

(10) Patent No.: US 10,689,036 B2
(45) Date of Patent: Jun. 23, 2020

(54) VEHICLE ROOF JOINT ASSEMBLY

(71) Applicant: Ford Global Technologies, LLC, Dearborn, MI (US)

(72) Inventors: Dragan B. Stojkovic, Taylor, MI (US); Stephen Thomas Kozak, Northville, MI (US); Edward Andrew Pleet, Novi, MI (US); Colleen Marie Hoffman, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/996,673

(22) Filed: Jun. 4, 2018

(65) Prior Publication Data
US 2019/0366819 A1    Dec. 5, 2019

(51) Int. Cl.
B62D 25/00    (2006.01)
B62D 25/06    (2006.01)
B62D 27/02    (2006.01)
B60R 21/13    (2006.01)

(52) U.S. Cl.
CPC ............. B62D 25/00 (2013.01); B62D 25/06 (2013.01); B62D 27/023 (2013.01); B60R 2021/137 (2013.01)

(58) Field of Classification Search
CPC ........ B62D 25/00; B62D 25/06; B62D 27/02; B62D 27/023; B60R 2021/137
USPC ....... 280/756; 296/193.12, 205, 103, 193.06, 296/102, 218
See application file for complete search history.

(56) References Cited

U.S. PATENT DOCUMENTS

| 4,715,649 A | * | 12/1987 | Bores | B60J 7/11 296/218 |
| 4,795,188 A | * | 1/1989 | Dueker | B60R 21/13 280/756 |
| 5,092,649 A | * | 3/1992 | Wurl | B62D 27/065 29/401.1 |
| 7,219,925 B2 | * | 5/2007 | Hill | B60R 21/055 280/730.1 |
| 7,293,823 B2 | | 11/2007 | Chen et al. | |

(Continued)

FOREIGN PATENT DOCUMENTS

EP      0956989 A1    11/1999
WO      2004054829 A2    7/2004

OTHER PUBLICATIONS

Jason Torchinsky, There Should be Modular Cars That Can Do Anything, Why New Technology Means We'll Build Cars Downton Abbey-Style in the Future, Mar. 6, 2015.

Primary Examiner — Dennis H Pedder
(74) Attorney, Agent, or Firm — David Coppiellie; Brooks Kushman P.C.

(57) ABSTRACT

A vehicle assembly including a vehicle body and a roof assembly is provided. The vehicle body may include a mid-pillar having a receiving region. The roof assembly may include a mid-pillar segment having an attachment end. The receiving region may be defined by a cutout having a base portion spaced from an adjacent vehicle body surface. The attachment end may be sized for disposal within the cutout for one or more fasteners to removably secure the mid-pillar segment to the mid-pillar. The receiving region and the attachment end may be arranged with one another such that the roof assembly is removably attachable adjacent a belt line of the vehicle body.

3 Claims, 10 Drawing Sheets

(56) References Cited

U.S. PATENT DOCUMENTS

| | | | |
|---|---|---|---|
| 8,678,433 B2* | 3/2014 | Oezkan | B60J 7/1204 |
| | | | 280/756 |
| 8,944,486 B2 | 2/2015 | Donohoe | |
| 8,991,896 B1 | 3/2015 | Whitehead | |
| 9,527,372 B2 | 12/2016 | Suesada et al. | |
| 2009/0212602 A1* | 8/2009 | Reed | B62D 25/04 |
| | | | 296/210 |

* cited by examiner

VEHICLE ROOF JOINT ASSEMBLY

TECHNICAL FIELD

The present disclosure relates to structural joint assemblies for roof assemblies of vehicles such as trucks.

BACKGROUND

Vehicle roof assemblies having a modular design present challenges in terms of achieving structural standards. These challenges are further increased in a vehicle roof assembly that is removable from a vehicle body. Vehicle features are needed to promote efficient roof assembly removal without causing undue physical strain for vehicle passengers while meeting desired vehicle structural standards.

SUMMARY

A vehicle assembly includes a vehicle body and a roof assembly. The vehicle body includes a mid-pillar having a receiving region. The roof assembly includes a mid-pillar segment having an attachment end. The receiving region is defined by a cutout having a base portion spaced from an adjacent vehicle body surface. The attachment end is sized for disposal within the cutout for one or more fasteners to removably secure the mid-pillar segment to the mid-pillar. The receiving region and the attachment end may be arranged with one another such that the roof assembly is removably attachable adjacent a belt line of the vehicle body. The vehicle assembly may further include a windshield assembly extending from a front end portion of the vehicle body. The windshield assembly may be arranged with the vehicle body such that the roof assembly is removable while the windshield assembly remains secured to the vehicle body. The mid-pillar may be a B-pillar or a C-pillar. The cutout may be defined between two edges of the mid-pillar at the adjacent vehicle body surface. The base portion of the cutout may be spaced from the adjacent vehicle body surface such that a close-out plate may be secured and extend between the two edges and a portion of the attachment end may be secured between the close-out plate and the base portion of the cutout. The mid-pillar may include an inner pillar component, an outer pillar component defining the receiving region, and an insert component disposed therebetween. The components may each include one or more apertures in registration with one another to receive a fastener for securing the attachment end thereto. The insert component may be shaped to define two or more cylindrical portions. Each of the cylindrical portions may define one of the one or more apertures.

A vehicle pillar assembly includes a windshield assembly, a handoff bracket, and a longitudinal member of a roof assembly. The windshield assembly is secured to a front end portion of a vehicle body. The handoff bracket is secured to the windshield assembly and includes a sleeve element extending in a vehicle body longitudinal direction. The longitudinal member is sized for partial disposal within the sleeve element such that the longitudinal member is removably attachable to the handoff bracket. The handoff bracket may include an X-portion for securing to a header component of the windshield assembly and a Y-portion for securing to a vehicle A-pillar. The windshield assembly may include a first arm, a second arm, and a header having an upper portion and a lower portion. The first arm and the second arm may extend laterally across the vehicle body and may be secured to one another and disposed between the upper portion and the lower portion. The removable attachment between the longitudinal member and the sleeve element may be facilitated by fasteners such that the roof assembly may be detached from the vehicle body as a single unit. The windshield assembly may further include an L-shaped first arm, an L-shaped second arm, a lower header component, and an upper header component. The first arm and the second arm may be secured to one another. The header components may be formed to define a cavity therebetween when secured to one another and the cavity may be sized to receive the first arm and the second arm therein. The windshield assembly may include a first arm having an upper portion extending in a lateral direction to a location substantially adjacent a portion of the handoff bracket extending in a lateral direction and secured to a header. The upper portion of the first arm may define a tubular shape oriented vertically relative to the vehicle body.

A joint assembly for a vehicle roof includes a first longitudinal roof member, a second longitudinal roof member, a first bracket, a cross-member, and a rear C-bow. The second longitudinal roof member is spaced laterally from the first longitudinal roof member. The first bracket extends laterally from the first longitudinal roof member at a location adjacent to a vehicle mid-pillar or rearward pillar. The cross-member is sized for securement and partial disposal within the first bracket. The rear C-bow is mounted to the cross-member and extends from the first longitudinal roof member to the second longitudinal roof member. The members are arranged with one another to form a cage structure selectively removable from a vehicle body at a location adjacent a vehicle belt line. The C-bow may include a first arc portion at a first end and a second arc portion at a second end. The C-bow may be arranged with the longitudinal roof members such that the arc portions transition from a lateral to a longitudinal orientation relative to the vehicle body. One of the longitudinal roof members and a tubular portion of the first bracket may define a stacked cross-sectional profile. The joint assembly may further include a second bracket and a tubular roll bar. The second bracket may extend longitudinally and rearward. The tubular roll bar may have a first end sized for securement and disposal within the second bracket and a second end for securing to a vehicle body adjacent a rearward pillar. The tubular roll bar may transition in a shape of one of an approximately forty-five degree angle from the second bracket to the rearward pillar, or an approximately ninety-degree angle from the second bracket to the rearward pillar with a curve portion therebetween. The first bracket may include a U-shaped component extending laterally to the vehicle body and may be sized to receive a portion of the cross-member.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be used in particular applications or implementations.

Figure 1:
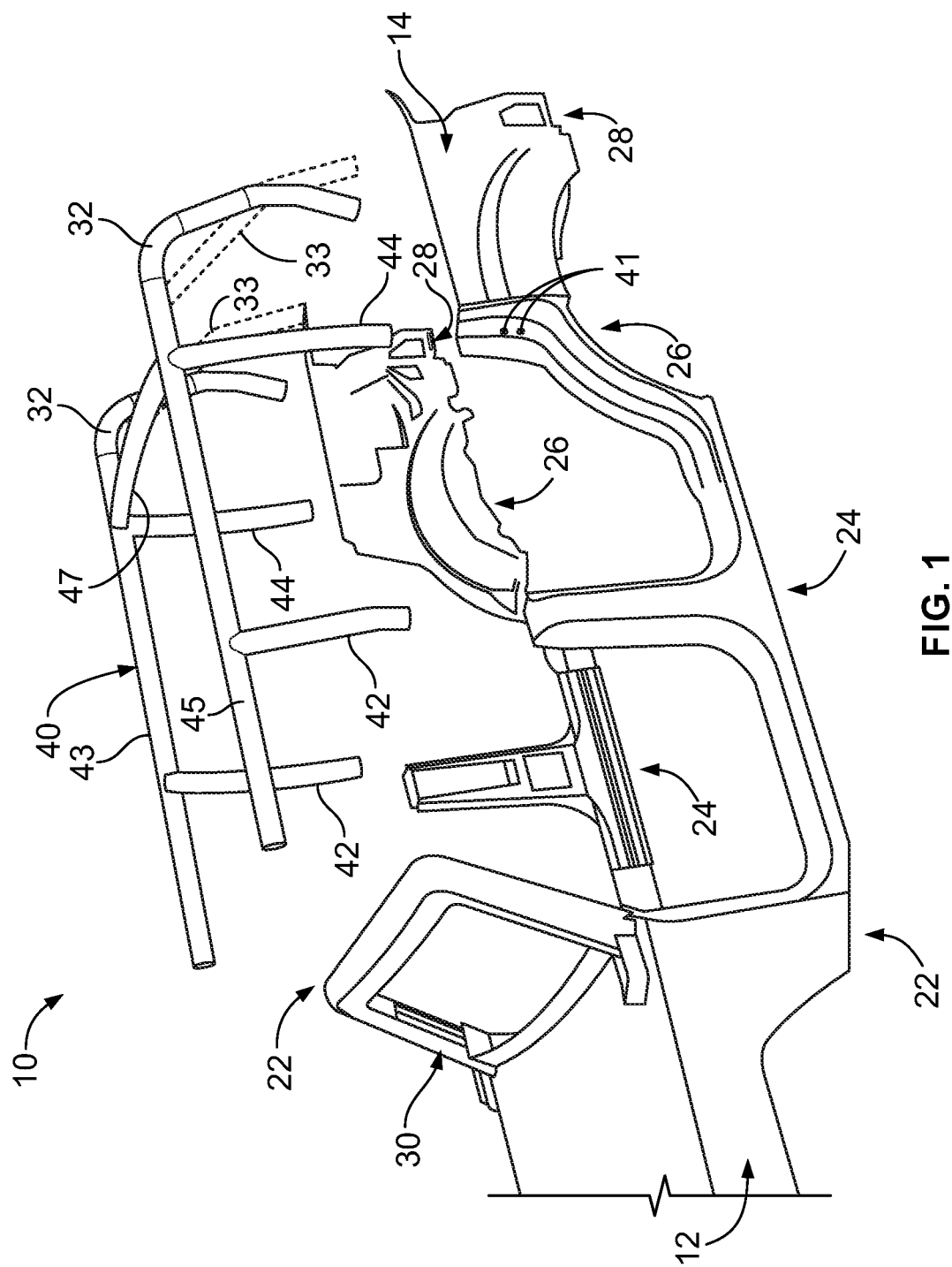
FIG. 1 is fragmentary perspective view of an example of a portion of a vehicle body.

FIG. 1 illustrates a fragmentary perspective view of a portion of an example of a vehicle body, referred to generally as a vehicle body 10 herein. The vehicle body 10 includes a front end portion 12, a rear end portion 14, and a vehicle cabin portion therebetween and defined by pillars. For example, the vehicle body may include A-pillars 22, B-pillars 24, C-pillars 26, and D-pillars 28. As described herein, the A-pillars 22 may be considered forward pillars and the B-pillars 24 may be considered mid-pillars. The C-pillars 26 may be considered mid-pillars or rearward pillars. The D-pillars may be considered rearward pillars. A windshield assembly 30 may be mounted at the front end portion 12 and the A-pillars 22.

Rear roll bars 32 may extend rearward from a roof assembly 40 and may be mounted at the rear end portion 14 of the vehicle body 10. The rear roll bars 32 may have various shapes and sizes and may comprise two components extending from the roof assembly 40. In FIG. 1, the rear roll bars 32 are shown extending downward in a curved-fashion for contact or removable securement to the rear end portion 14 at a location between the C-pillars 26 and the D-pillars 28. In another example, the rear roll bars 32 may extend downwardly at a sharper angle or more continuous shape in comparison to the embodiment shown in FIG. 1, such as rear extensions 33 shown in broken lines in FIG. 1 shown extending at approximately forty-five degrees.

The roof assembly 40 may be removably secured to the vehicle body 10 at one or more of the A-pillars 22, the B-pillars 24, the C-pillars 26, and the D-pillars 28. For example, the roof assembly 40 may form a cage-like structure and may include features to assist in removing the roof assembly 40 to provide an open-air ride experience for passengers. The roof assembly 40 may be sized to extend from a belt line region of the vehicle body 10. The belt line may be located at a substantially central location of the vehicle body 10 relative to a height of the vehicle body 10. For example, the belt line may be defined by an axis extending longitudinally along the vehicle body at or above door handles (not shown in FIG. 1) or door latch receiving apertures 41. The roof assembly 40 may include a first longitudinal member 43 and a second longitudinal member 45 extending for contact with each respective pillar segment. A C-bow 47 may extend between the first longitudinal member 43 and the second longitudinal member 45 at a location adjacent a mid-pillar region such as the C-pillars 26. The C-bow 47 may also be referred to as a rear header herein.

Figure 2B:
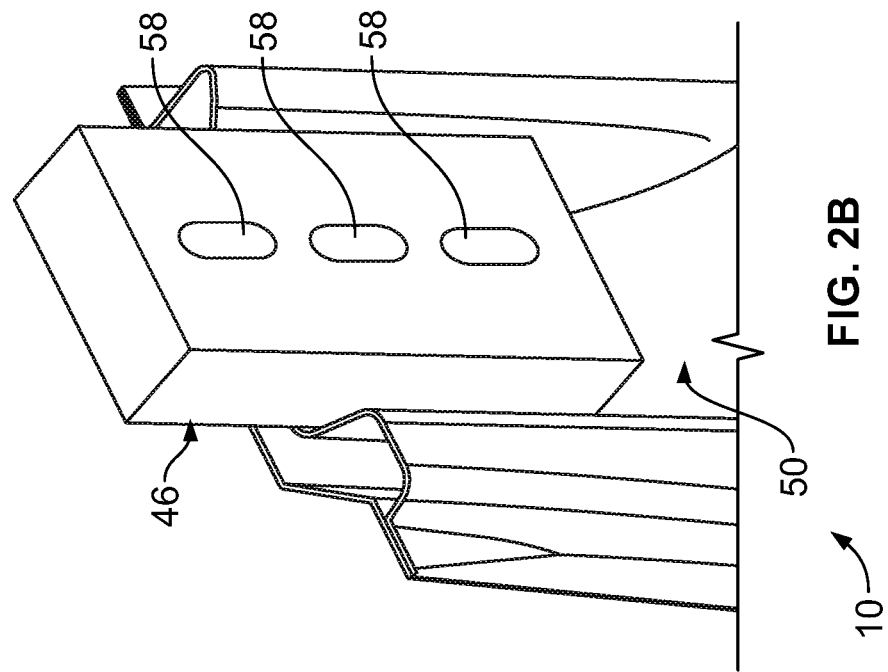
FIG. 2B is a detailed perspective view, in partial cross-section, of a portion of the joint assembly of FIG. 2A.
Figure 2A:
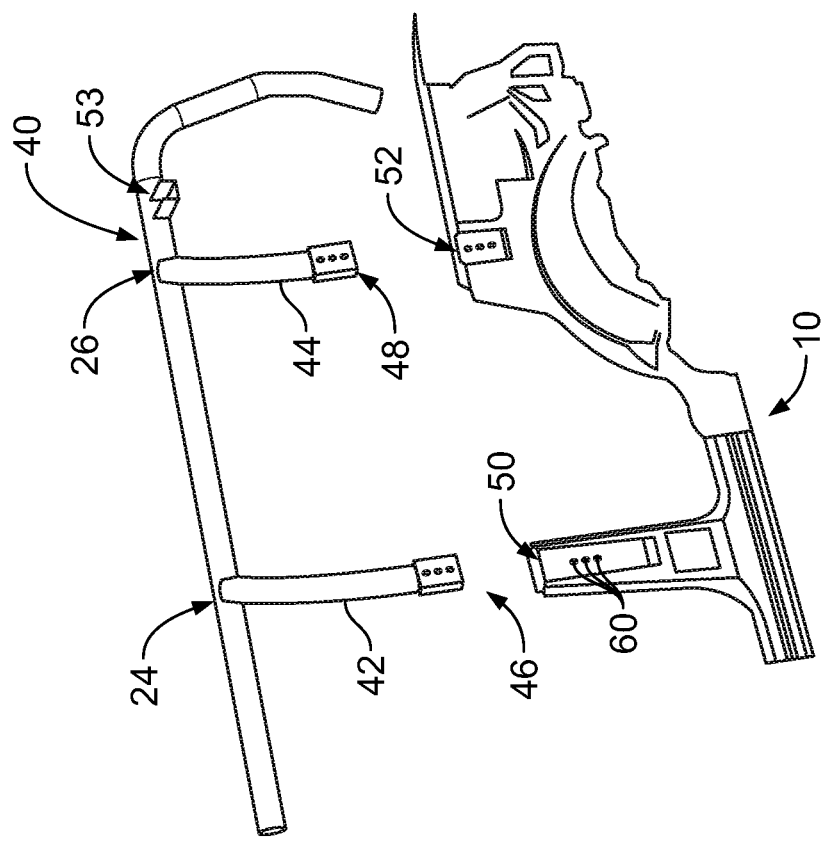
FIG. 2A is a fragmentary perspective view of a portion of a joint assembly of the vehicle body of FIG. 1.

FIG. 2A is a perspective view illustrating an example of a portion of a joint assembly for securing the roof assembly 40 to the vehicle body 10 at the B-pillars 24 and the C-pillars 26. For example, the roof assembly 40 may include a B-segment 42 and a C-segment 44. The B-segment 42 may include an attachment end 46 and the C-segment 44 may include an attachment end 48. The vehicle body 10 may include a B-segment receiving region 50 and a C-segment receiving region 52. Each of the B-segment receiving region 50 and the C-segment receiving region 52 may be formed as part of the vehicle body 10 as a cutout having a base portion spaced from a surface of the vehicle body 10 to receive a respective attachment end. A roof bow joint 53 may extend from the roof assembly 40 at a location rearward of the C-pillar 26 to assist in providing structural rigidity to the roof assembly 40 as further discussed herein.

FIG. 2B is a detailed perspective view of a portion of the joint assembly of FIG. 2A. In this example, the attachment end 46 is shown with three apertures 58. Each of the three apertures 58 may be sized to receive a fastener for securing a portion of the roof assembly 40 to the vehicle body 10. For example, the B-segment receiving region 50 may include three apertures 60 (shown in FIG. 2A) to each receive a fastener extending through one of the three apertures 58. The attachment end 48 of the C-segment 44 may have similar fastener apertures for securing the C-segment 44 to the C-segment receiving region 52. While FIGS. 2A and 2B illustrate a portion of one side of the vehicle body 10 and the roof assembly 40, it is contemplated that similar components and attachment features may be included on another side of the vehicle body 10.

Figure 2C:
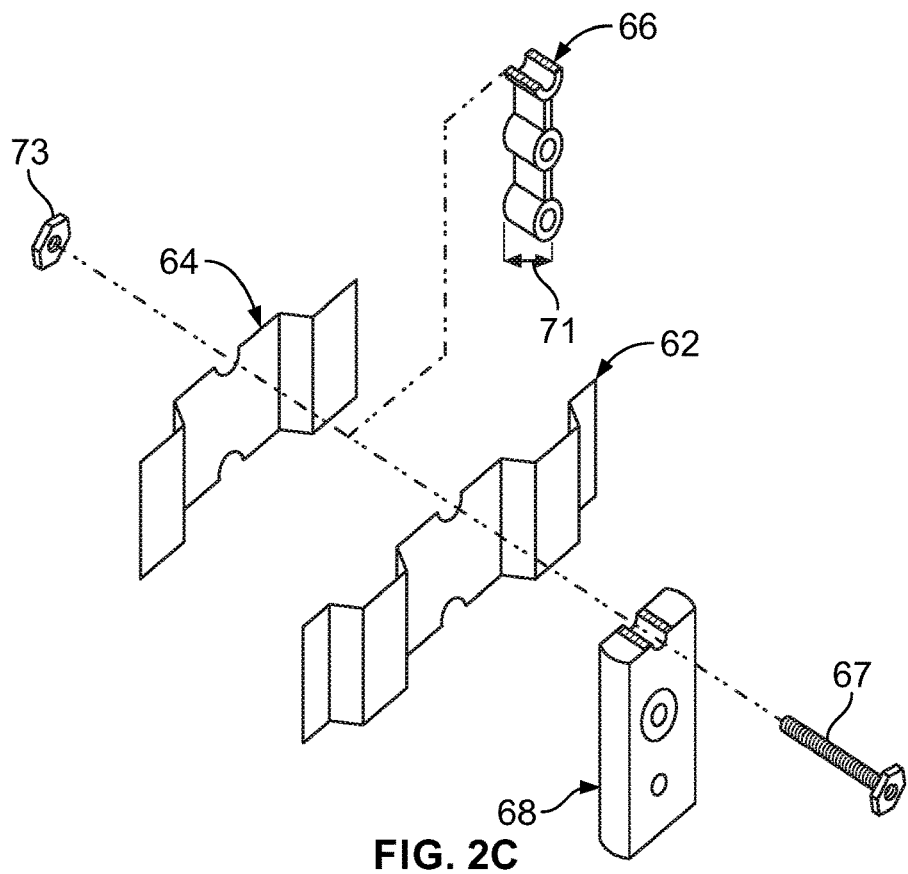
FIG. 2C is an exploded perspective view of an example of a portion of the joint assembly of FIG. 2A.

FIG. 2C is a fragmentary perspective view of a portion of the joint assembly of FIGS. 2A and 2B illustrating an example of a structural design to secure one of the segments of the roof assembly 40 to the vehicle body 10. In this example, the vehicle body 10 includes a pillar inner 62 and a pillar outer 64. A structural insert 66 includes receiving apertures corresponding to a desired number of fasteners for securing a portion of a pillar, such as the attachment end 46 or the attachment end 48, between the pillar inner 62 and the pillar outer 64. For example, the pillar inner 62, the pillar outer 64, the structural insert 66, and a pillar segment 68 may be arranged with one another such that apertures of each component are in registration with one another for a fastener to extend therethrough, such as a fastener 69. A nut 73 may be secured to an end of the fastener 69 to further secure the pillar inner 62, the pillar outer 64, the structural insert 66, and the pillar segment 68 to one another. The structural insert 66 may be sized to provide a desired amount of crush resistance to impacts or loads received by the pillar inner 62 and/or the pillar outer 64. For example, a dimension 71 may have a length selected based on a material of the structural insert 66 and the surrounding components to provide desired load absorption and deflection. The structural insert 66 may also be described as an insert component herein. The structural insert 66 may be shaped to define two or more cylindrical portions. Each of the cylindrical portions may define one of the receiving apertures corresponding to the desired number of fasteners for securing the attachment end 46 or the attachment end 48 between the pillar inner 62 and the pillar outer 64. In one example, the pillar inner 62, the pillar outer 64, the structural insert 66, and the pillar segment 68 may be of a steel material.

Figure 3B:
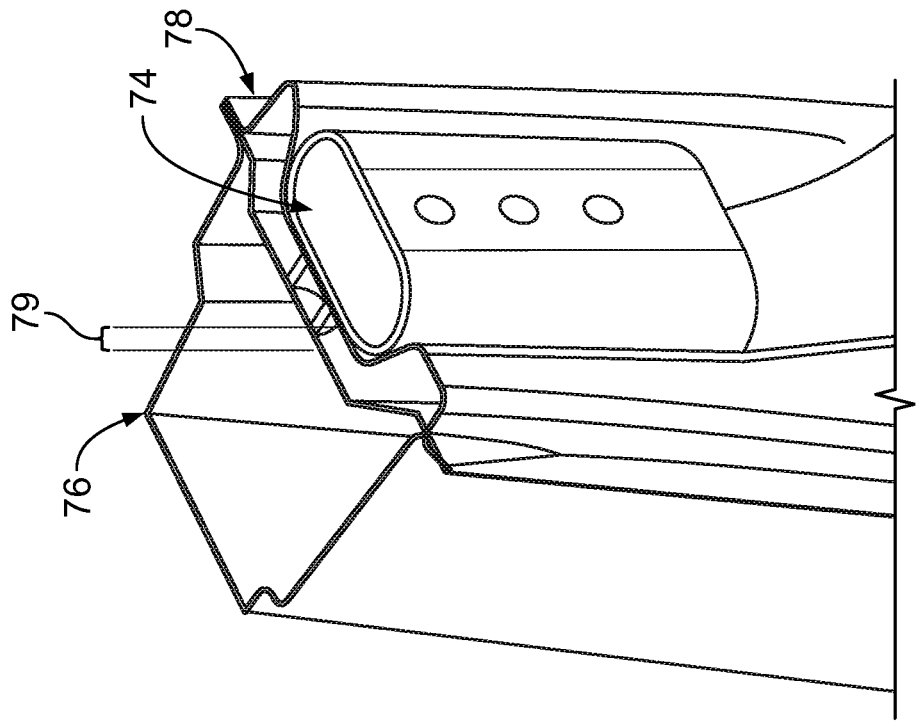
FIG. 3B is a detailed view, in cross-section, of a portion of the joint assembly of FIG. 3A.
Figure 3A:
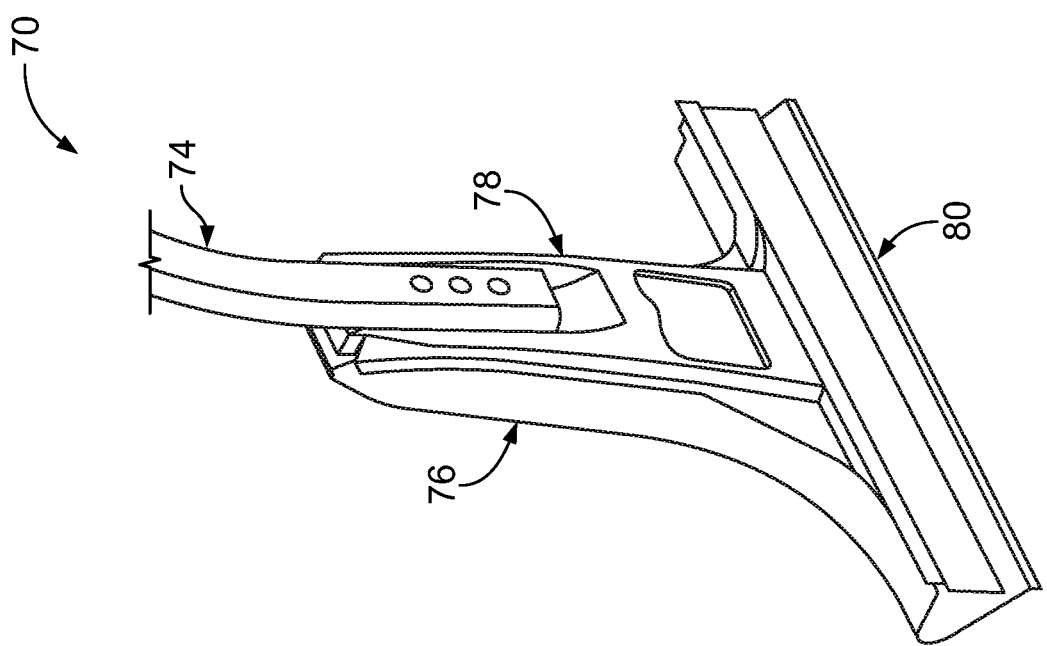
FIG. 3A is a fragmentary perspective view of an example of a pillar-to-rocker joint assembly of the vehicle body of FIG. 1.

FIGS. 3A and 3B illustrate another example of a joint assembly for a roof assembly and a vehicle body at a B-pillar region, referred to generally as a joint assembly 70. The joint assembly 70 includes a pillar segment 74, a pillar outer 76, a pillar inner 78, and a rocker 80. The pillar segment 74 may define a tubular shape and have rounded corners. The tubular shape provides a single pillar component having structurally similar characteristics of a pillar component in which two or more stamped components are secured to one another.

The pillar outer 76 and the pillar inner 78 may be sized to define a cavity therebetween when mounted to one another. The cavity may have a dimension 79. A length of the dimension 79 may be selected based on crush characteristics of the pillar outer 76 and the pillar inner 78.

Figure 4:
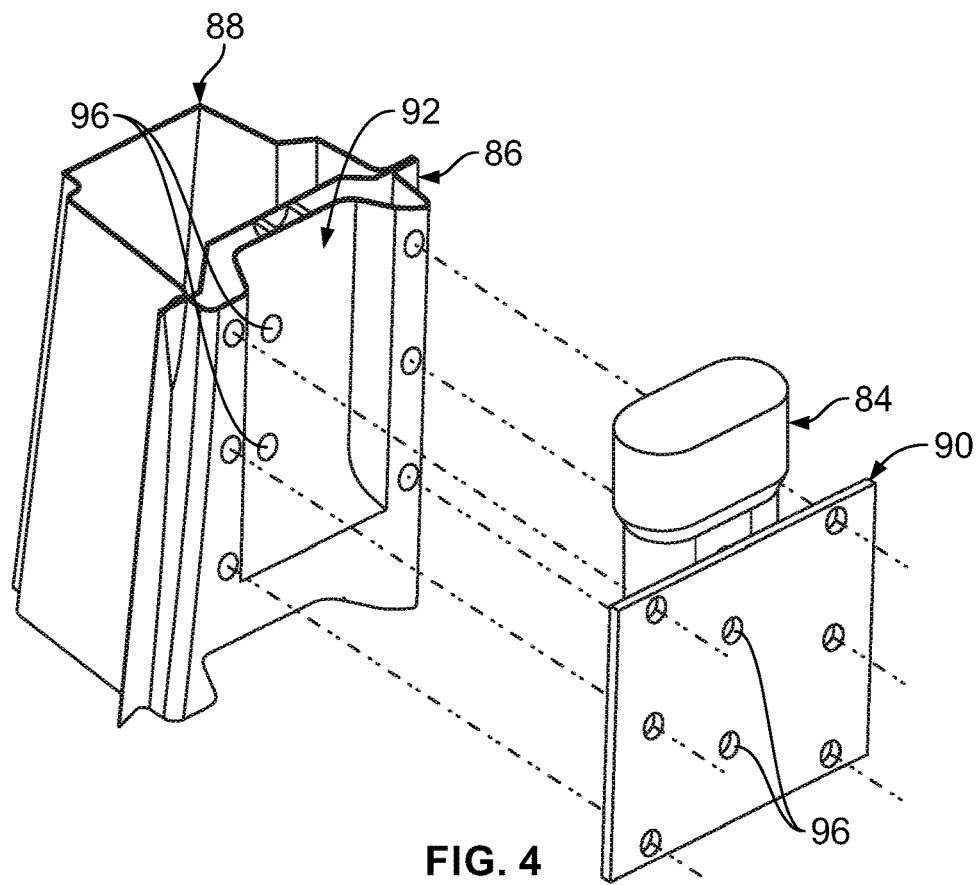
FIG. 4 is a partially exploded perspective view of an example of a portion of a vehicle structure joint assembly.

FIG. 4 illustrates another example of a joint assembly for a vehicle body, such as the vehicle body 10. In this example, the joint assembly includes a pillar segment 84, a pillar inner 86, a pillar outer 88, and a close-out plate 90. The close-out plate 90 operates to improve a strength of the joint by distributing loads received in a pillar of the vehicle body located adjacent the joint assembly. For example, the pillar inner 86 may be mounted to the pillar outer 88. The pillar inner 86 may include a segment receiving region 92. The receiving region 92 may be sized to receive the pillar segment 84 such that the close-out plate 90 may be secured to the pillar inner 86 in a substantially flush fit. Example fastener apertures 96 are shown in FIG. 4 to receive fasteners to secure the pillar segment 84, the pillar inner 86, and the close-out plate 90 to one another.

FIGS. 5A through 5D illustrate an example of a windshield joint assembly, referred to generally as a windshield assembly 100 herein. The windshield assembly 100 includes a first arm 102 secured to a second arm 104. The first arm 102 may be secured to the second arm 104 by, for example, one or more welds or fasteners. The first arm 102 and/or the second arm 104 may include one or more weld apertures 105 such that a weld tool may have access for welding operations. The first arm 102 and the second arm 104 may be secured to one another and mounted to a header. The header may be formed of multiple components, such as an upper portion and a lower portion shaped to correspond to a respective windshield assembly.

Figure 5A:
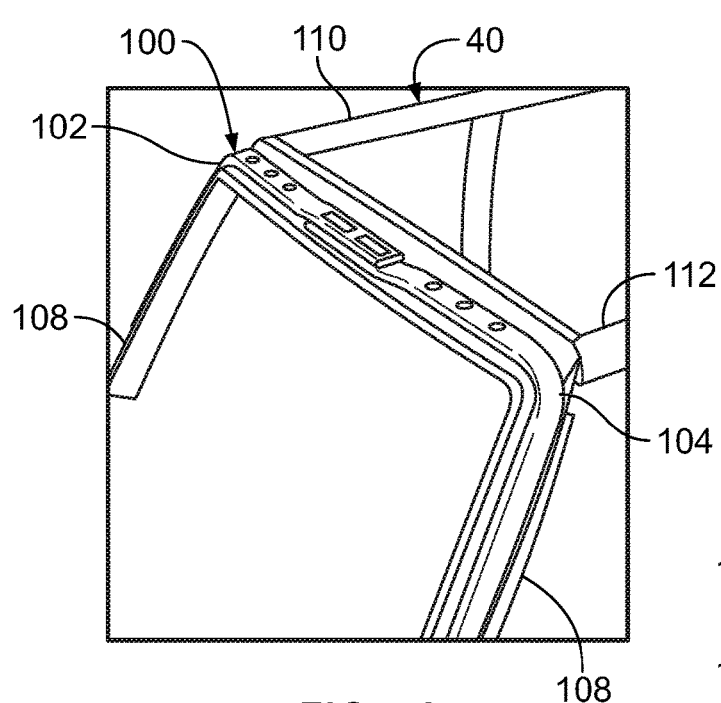
FIG. 5A is a fragmentary perspective view of an example of a portion of a windshield assembly and a portion of a vehicle roof assembly.
Figure 5C:
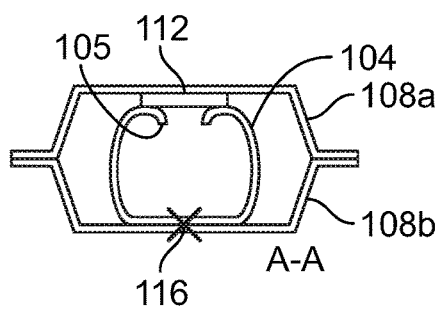
FIG. 5C is a side view, in cross-section, of an example of a portion of the windshield assembly of FIG. 5A.
Figure 5D:
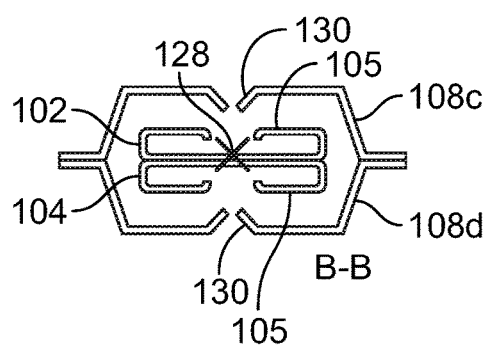
FIG. 5D is a side view, in cross-section, of another example of a portion of the windshield assembly of FIG. 5A.
Figure 5B:
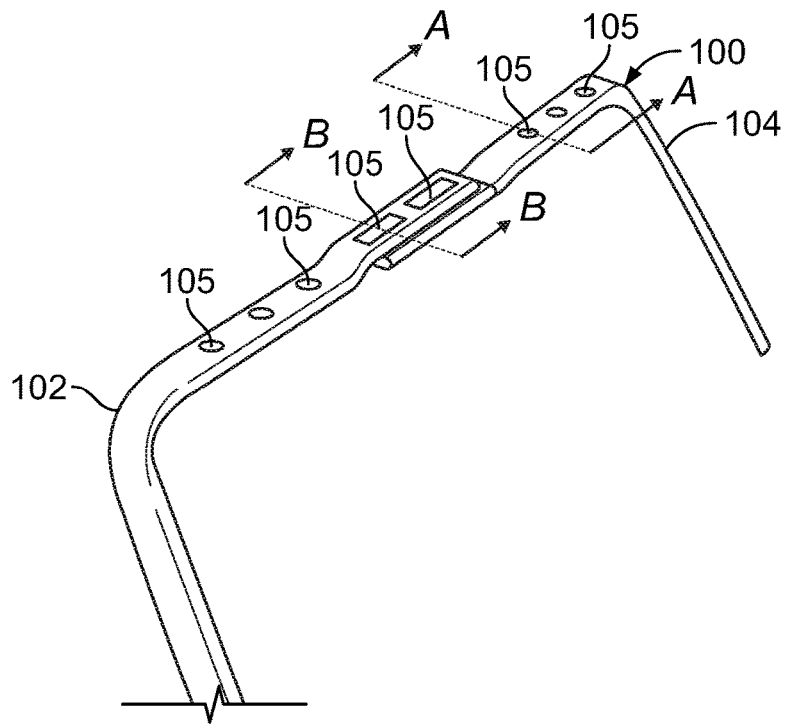
FIG. 5B is a perspective view of a portion of the windshield assembly of FIG. 5A.
Figure 6A:
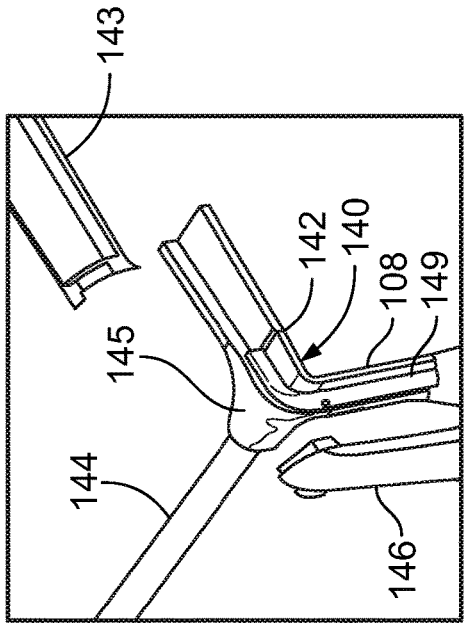
FIG. 6A is an exploded perspective view of a portion of an example of a handoff bracket, a longitudinal member, and a lateral member for a vehicle roof assembly.
Figure 6B:
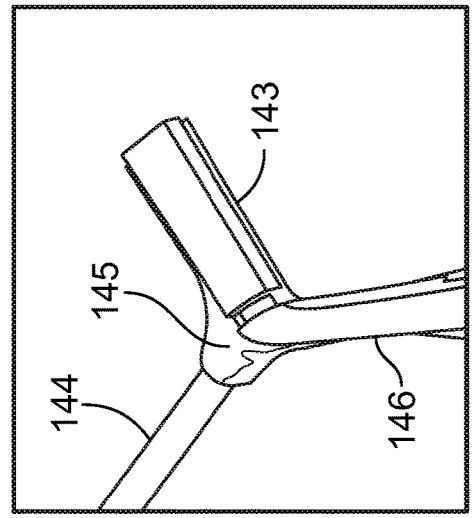
FIG. 6B is a partially exploded perspective view of the components of FIG. 6A showing the longitudinal member mounted to the handoff bracket.
Figure 6C:
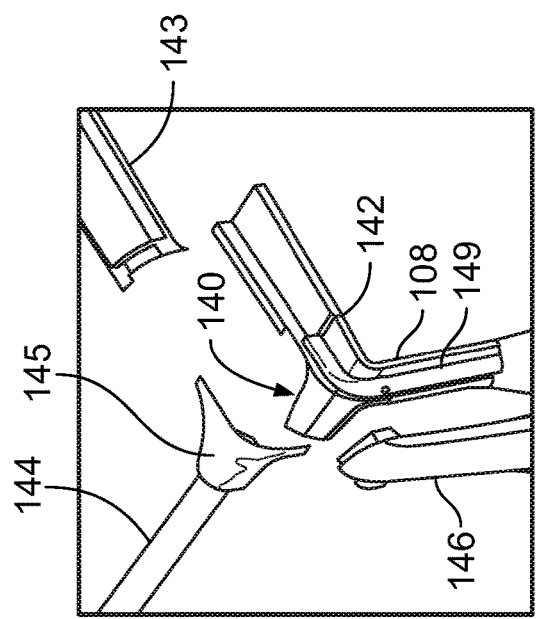
FIG. 6C is a partially exploded perspective view of the components of FIG. 6A showing the longitudinal member and an A-pillar member secured to the handoff bracket.
Figure 6D:
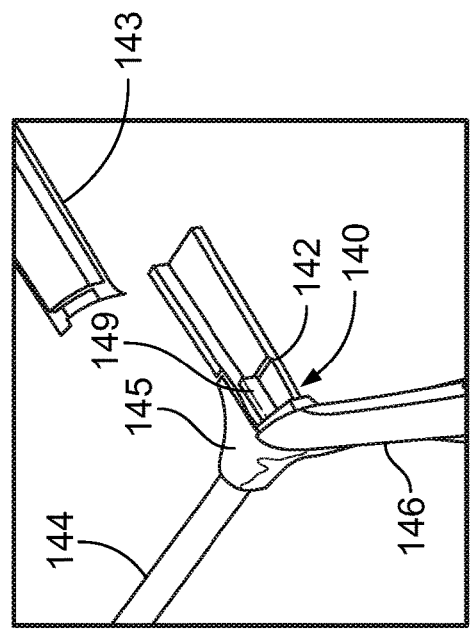
FIG. 6D is a perspective view of the components of FIG. 6A shown assembled with one another.

For example, a lower portion of a header 108 is shown in FIG. 5A and in FIG. 1 a header is shown with an upper portion mounted to a lower portion. The header 108 may be removably secured to a first longitudinal member 110 and a second longitudinal member 112, each of the roof assembly 40. Various cross-sections are available for the header 108, the first arm 102, and the second arm 104 as shown in FIGS. 5C and 5D. In these examples, the header 108 is formed so that the first arm 102 and the second arm 104 may each be disposed within the header 108. For example, the header 108 may be formed to have a tube shape with a cavity sized to receive the first arm 102 and the second arm 104.

FIG. 5C illustrates a cross-sectional view of an example of a portion of the windshield assembly 100 at section A-A. In this example, the header 108 is formed of an upper portion 108*a* and a lower portion 108*b*. The upper portion 108*a* is secured to the second arm 104 at a structural insert 113 at a location adjacent one of the weld apertures 105. The structural insert 113 may be, for example, a structural adhesive material. The lower portion 108*b* is secured to the second arm 104 via a weld represented by X 116. In one example, the second arm 104 is secured to the lower portion 108*b* and then the upper portion 108*a* is mounted to the second arm 104 and the lower portion 108*b*.

FIG. 5D illustrates a cross-sectional view of an example of a portion of the windshield assembly 100 at section B-B. In this example, the header 108 is formed of an upper portion 108*c* and a lower portion 108*d*. A central region of the first arm 102 and the second arm 104 is not secured to the upper portion 108*c* and the lower portion 108*d*. Rather, the upper portion 108*c* and the lower portion 108*d* are secured to outboard ends of the first arm 102 and the second arm 104. The first arm 102 is secured to the second arm 104 via a weld represented by X 128. Access for applying the weld represented by X 128 may be facilitated by an aperture 130 of the lower portion 108*d* in registration with one of the weld apertures 105.

FIGS. 6A through 6D illustrate an example of a handoff bracket assembly for securing a windshield assembly to a roof assembly at a vehicle forward upper corner portion. A handoff bracket 140 may be secured to an A-pillar portion of the vehicle body 10 and a lateral member of the vehicle body 10, such as the header 108. The handoff bracket 140 may include a sleeve element 142 extending in a vehicle body longitudinal direction. The sleeve element 142 may be sized to receive a portion of a longitudinal member of a roof assembly and/or for a portion of a lateral member of a roof assembly to be mounted thereto, such as a lateral member 143 and a longitudinal member 144. A portion of the sleeve element 142 may It is contemplated that the longitudinal member 144 may be removably secured to the handoff bracket 140 via various methods such as a method including fasteners. The removable securement of the longitudinal member 144 may assist in removing the roof assembly 40 from the vehicle body 10. A corner element 145 may further secure the longitudinal member 144 to the handoff bracket 140. An outer A-pillar element 146 may be secured to the header 108 and the handoff bracket 140. The handoff bracket 140 may include an X portion for securing to the header 108 and a Y portion for securing to the A-pillar.

Figure 7B:
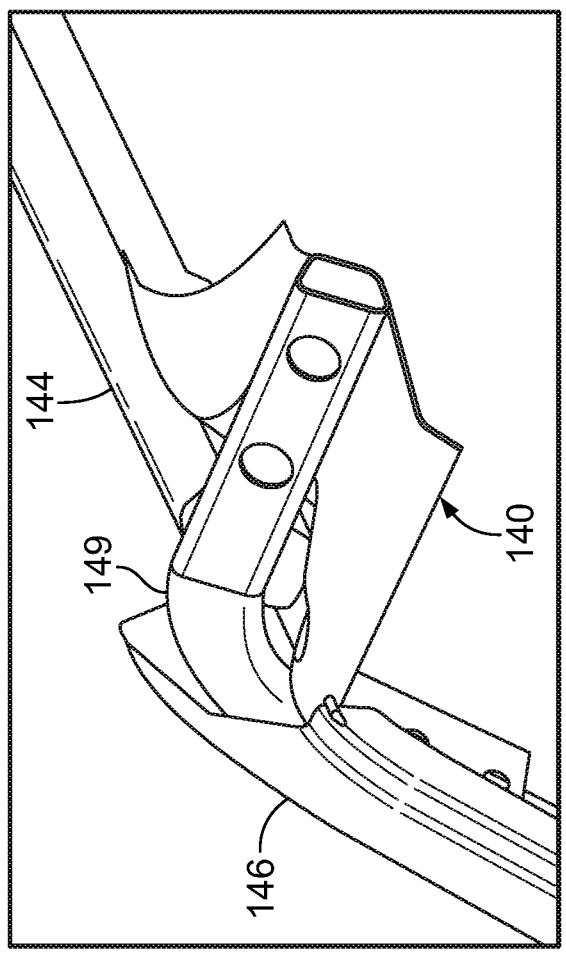
FIG. 7B is a detailed perspective view of a portion of the joint assembly of FIG. 7A.
Figure 7A:
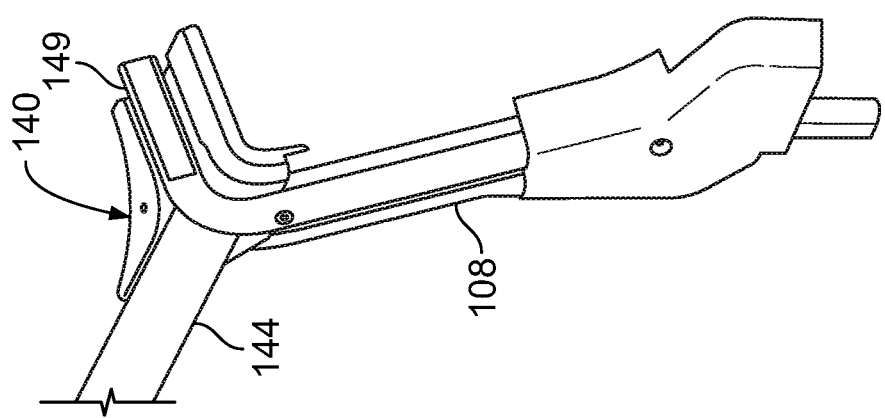
FIG. 7A is a perspective view of an example of a portion of a joint assembly for a vehicle A-pillar.

In this example, an arm component 149 defines a shape different then a shape of the first arm 102 and the second arm 104. For example, the arm component 149 may define a tubular shape having a substantially elliptical cross-sectional profile extending along a respective A-pillar. The arm component 149 may further transition to a tubular shape having a substantially trapezoidal cross-sectional profile (best shown in FIG. 7B) oriented vertically relative to the vehicle body 10 and extending along a header region to a location substantially adjacent a portion of the handoff bracket 140 extending in a lateral direction for securing to the header. In contrast to the first arm 102 and the second arm 104, the arm component 149 only partially extends along the header region and is not secured to an opposing arm component. Rather, the arm component 149 may be secured to the handoff bracket 140 and the outer A-pillar element 146. FIGS. 7A and 7B illustrate further detail on component securement within the handoff bracket assembly of FIGS. 6A through 6D.

Figure 8:
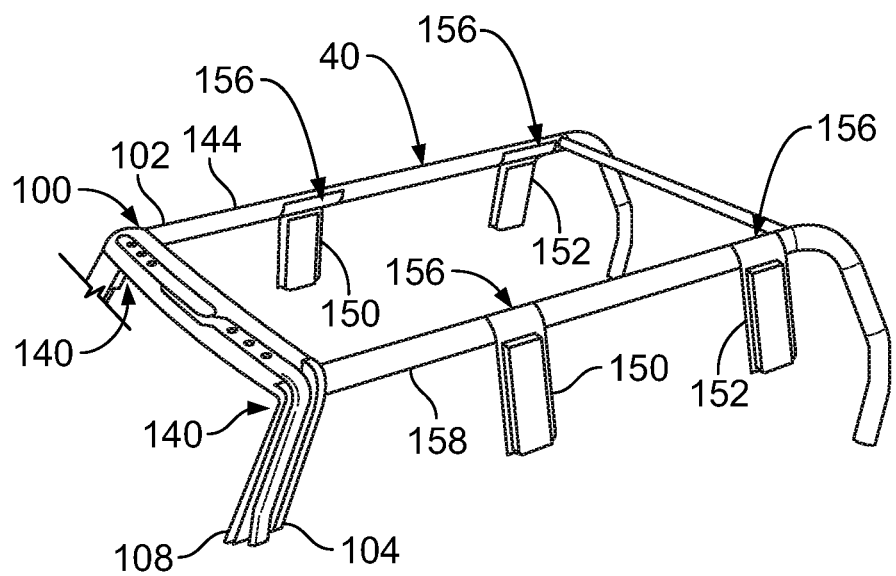
FIG. 8 is a fragmentary perspective view of an example of a portion of a vehicle roof assembly.

FIG. 8 illustrates an example location for the handoff bracket 140 at a vehicle forward upper corner portion where the roof assembly 40 is removably secured to the windshield assembly 100. This example includes the first arm 102 and the second arm 104. A pair of B-pillar segments 150 and a pair of C-pillar segments 152 may each include a partial sleeve component 156 to receive a portion of the longitudinal member 144 or a longitudinal member 158. Each sleeve component 156 may be secured to a respective portion of the longitudinal member 148 or the longitudinal member 158 via, for example, fasteners such that each longitudinal member is removable with the roof assembly 40 from the vehicle body 10.

Figure 9A:
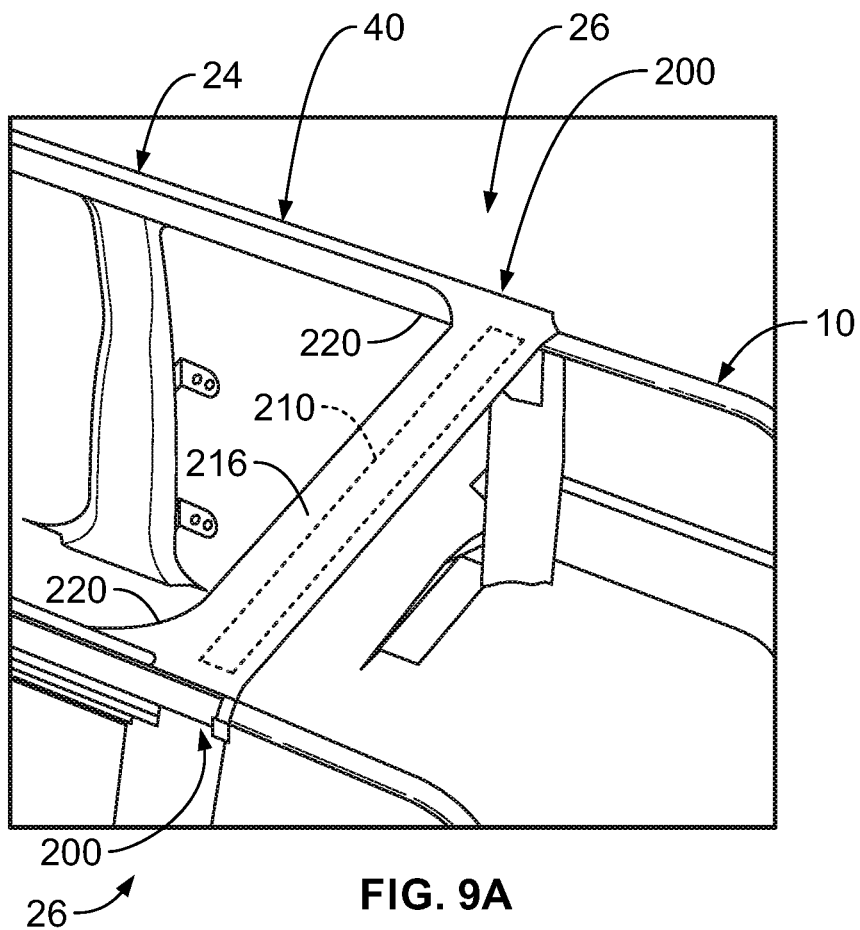
FIG. 9A is a fragmentary perspective view of a portion of a vehicle body showing an example of a rear portion of a roof assembly.
Figure 9B:
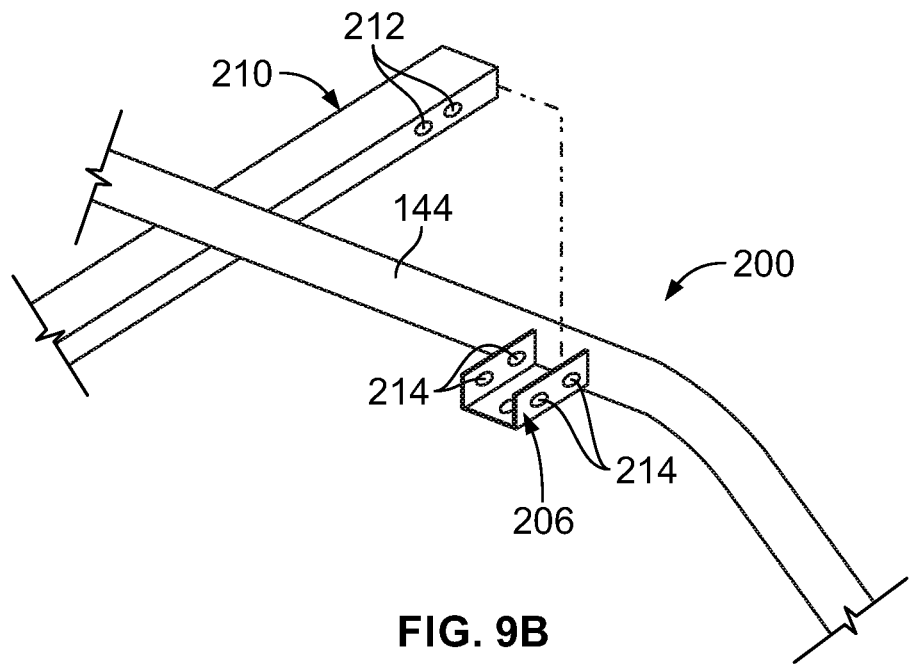
FIG. 9B is a partially exploded perspective view of a portion of a joint assembly of the roof assembly of FIG. 9A.

FIGS. 9A and 9B illustrate an example of a mid-pillar or rear pillar joint assembly of a vehicle roof assembly, referred to as a joint assembly 200. The joint assembly 200 may be for placement at the C-pillar 26 of the vehicle body 10 to removably secure a portion of the roof assembly 40 to the vehicle body 10. For example, the joint assembly 200 may be included in an embodiment with the joint assembly and the roof assembly 40 described in relation to FIGS. 2A through 4. Additionally, the joint assembly 200 may be included in an embodiment with the windshield assembly 100 as described in relation to FIGS. 5A through 8.

The joint assembly 200 may include a bracket 206 extending laterally from the longitudinal member 144. The bracket 206 may define a U-shaped portion and may be sized to receive a portion of a cross-beam, such as a cross-beam 210. The cross-beam 210 may include one or more apertures 212 for registration with corresponding apertures 214 on the bracket 206 such that fasteners may be used to secure the cross-beam 210 to the bracket 206. A rear C-bow or rear header 216 may be secured to the cross-beam 210 such that the rear header 216 may be removed with the joint assembly 200. The cross-beam 210 and the rear header 216 are arranged with the vehicle body 10 to assist in absorbing cross-vehicle stresses. The rear header 216 may include arc-portions 220 at each end to further assist in providing structural rigidity to the roof assembly 40.

Figure 10A:
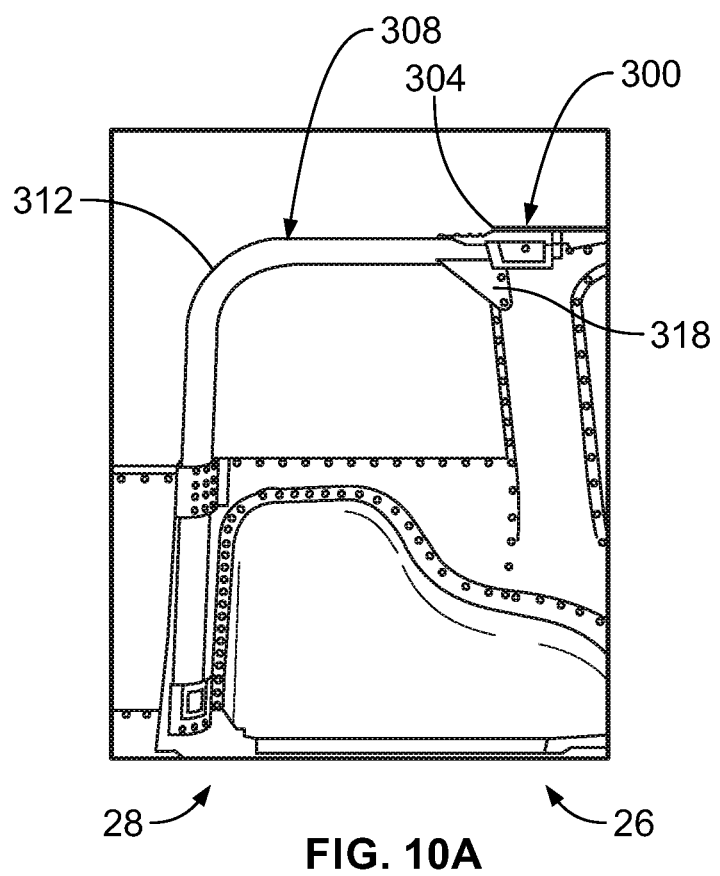
FIG. 10A is a side view of a portion of a vehicle body showing an example of a rear portion of a roof assembly.
Figure 10B:
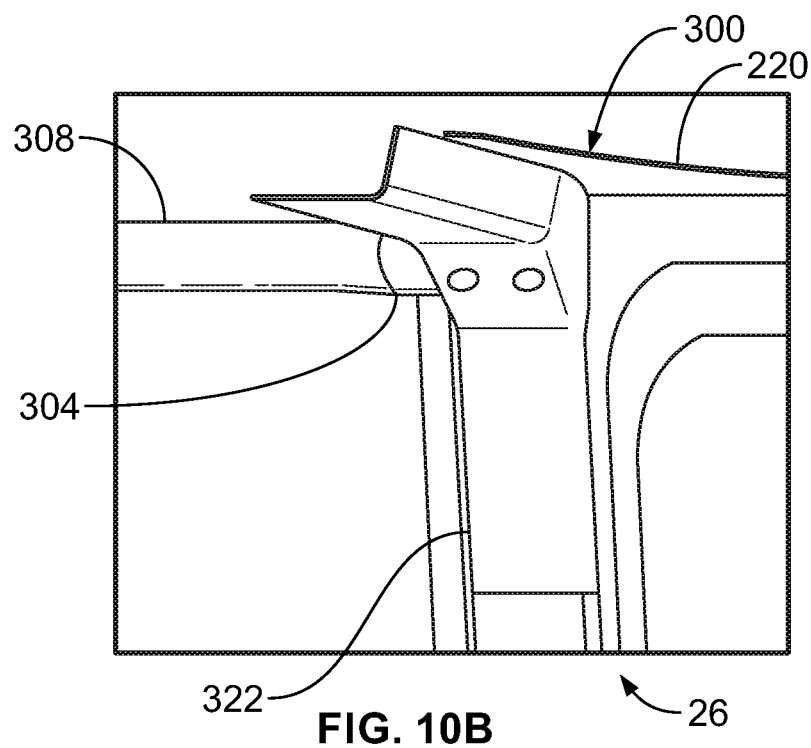
FIG. 10B is a fragmentary perspective view of an example of a portion of a joint assembly of the roof assembly of FIG. 10A.
Figure 10C:
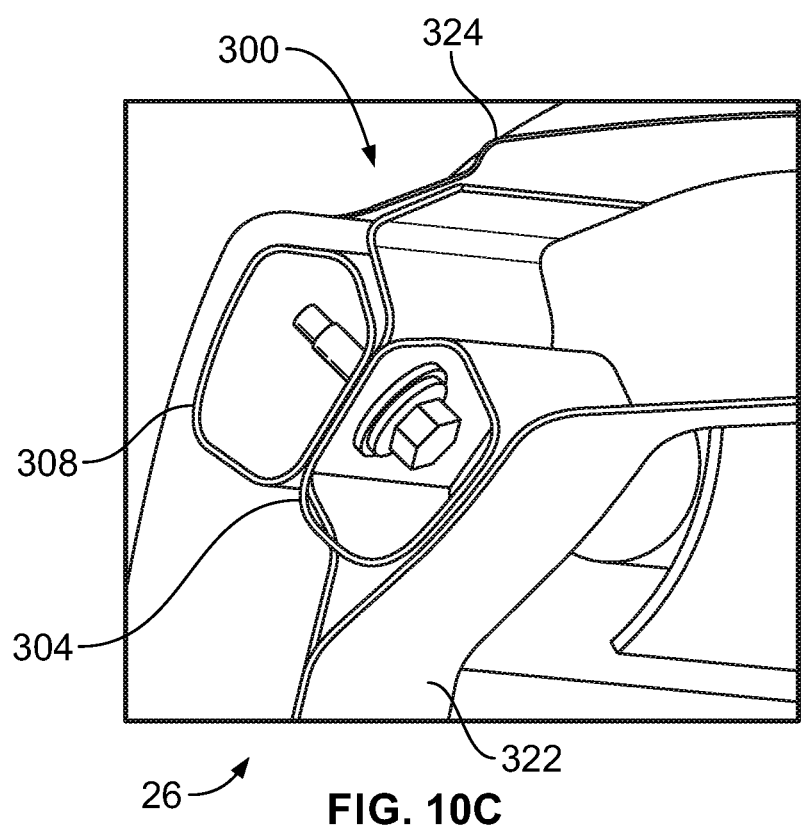
FIG. 10C is a fragmentary perspective view, in cross-section, of a portion of the joint assembly of FIG. 10B.

FIGS. 10A through 10C illustrate an example of portions of a joint assembly for a vehicle roof assembly, such as the roof assembly 40. A joint assembly 300 may be located at a rearward pillar of a vehicle body, such as the C-pillar 26 of the vehicle body 10 shown in FIG. 1. For example, the joint assembly 300 may be located at a connection region between the C-segment 44 and the second longitudinal member 45 of the vehicle body 10 of FIG. 1. In this example, the joint assembly 300 is shown at a connection between a C-segment 301 and a roll bar 308. The joint assembly 300 may include a bracket 304 oriented longitudinally and extending rearward relative to a vehicle body. The bracket 304 may be sized to receive a portion of the roll bar 308.

The roll bar 308 may be formed as a tubular component and may include a first end for securement and disposal within the bracket 304 and a second end for removably securing to a rear portion of a vehicle body, such as a location adjacent the D-pillar 28 of the vehicle body 10 or a location between the C-pillar 26 and the D-pillar 28 of the vehicle body 10. The roll bar 308 may transition from the bracket 304 to the rear portion of the vehicle body in various shapes. In one example, the roll bar 308 may transition approximately ninety-degrees (as shown in FIG. 10A) and include a curve portion 312. In another example, the roll bar 308 may transition along an approximately forty-five degree angle as shown with the rear extensions 33 in broken lines in FIG. 1. In yet another example, the roll bar 308 may transition along various angles with various curve portions as shown with the rear roll bars 32 of FIG. 1. A support brace 318 may be secured to the C-pillar 26 and the roll bar 308 to provide additional structural rigidity at the joint assembly 300. As shown in FIG. 10A, the support brace 318 may define a triangular shape though it is contemplated that other shapes are available. One or more fasteners 319 may provide additional securement support of a housing 322 to the C-pillar 26.

The joint assembly 300 and adjacent vehicle components may be arranged with one another to define a tubular stack as shown in a perspective view, in cross-section in FIG. 10C. The tubular stack may include the bracket 304 and the roll bar 308 disposed within the housing 322. A support member 324 may be secured between the bracket 304 and the roll bar 308 and extend longitudinally relative to the vehicle body 10. The tubular stack provides additional support at the joint to assist in dispersing received forces.

It is contemplated that a vehicle body may include a roof assembly having features of the joint assembly 200 and the joint assembly 300 along with the joint assembly described in relation to FIGS. 2A and 2B to provide a removable roof assembly for the vehicle body.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A joint assembly for a vehicle roof comprising:
a first longitudinal roof member;
a second longitudinal roof member spaced laterally from the first longitudinal roof member;
a first bracket extending laterally from the first longitudinal roof member at a location adjacent to a mid-pillar or rearward pillar of a vehicle body;
a cross-member sized for securement and partial disposal within the first bracket;
a rear C-bow mounted to the cross-member and extending from the first longitudinal roof member to the second longitudinal roof member, the rear C-bow including a first arc portion at a first end and a second arc portion at a second end, the rear C-bow arranged with the first and second longitudinal roof members such that the arc portions transition from a lateral to a longitudinal orientation relative to the vehicle body; and
a second bracket extending longitudinally and rearward and located at the rearward pillar of the vehicle body; and
a tubular roll bar having a first end sized for securement and disposal within the second bracket and a second end for securing to the vehicle body adjacent the rearward pillar,
wherein the members are arranged with one another to form a cage structure selectively removable from a vehicle body at a location adjacent a vehicle belt line.

2. The assembly of claim 1, wherein the tubular roll bar transitions in a shape of one of an approximately forty-five degree angle from the second bracket to the rearward pillar, or an approximately ninety-degree angle from the second bracket to the rearward pillar with a curve portion therebetween.

3. The assembly of claim 1, wherein the first bracket includes a U-shaped component extending laterally to the vehicle body and sized to receive a portion of the cross-member.

* * * * *